US012723189B1

(12) United States Patent
Ke et al.

(10) Patent No.: US 12,723,189 B1

(45) Date of Patent: Sep. 1, 2026

(54) FOAMED FRACTURING FLUID WITH SCALE PROTECTION

(71) Applicant: Halliburton Energy Services, Inc., Houston, TX (US)

(72) Inventors: Linping Ke, Houston, TX (US); Zhiwei Yue, Houston, TX (US); Ronald Dusterhoft, Duncan, OK (US); Philip Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/176,051

(22) Filed: Apr. 10, 2025

(51) Int. Cl.
*E21B 43/26* (2006.01)
*C09K 8/70* (2006.01)
*C09K 8/80* (2006.01)

(52) U.S. Cl.
CPC ................ *C09K 8/703* (2013.01); *C09K 8/80* (2013.01); *E21B 43/2605* (2020.05)

(58) Field of Classification Search
None
See application file for complete search history.

(56) References Cited

U.S. PATENT DOCUMENTS

| | | | |
|---|---|---|---|
| 5,990,052 A | 11/1999 | Harris | |
| 7,261,158 B2 | 8/2007 | Middaugh et al. | |
| 8,309,498 B2 | 11/2012 | Funkhouser et al. | |
| 9,688,905 B2 | 6/2017 | Nguyen et al. | |
| 9,695,353 B2 | 7/2017 | Nelson et al. | |
| 11,326,092 B2 | 5/2022 | Liang et al. | |
| 2007/0044965 A1 | 3/2007 | Middaugh et al. | |
| 2008/0108522 A1* | 5/2008 | Carman | C09K 8/68 507/214 |
| 2012/0006551 A1 | 1/2012 | Carman et al. | |
| 2013/0105167 A1 | 5/2013 | Norman | |
| 2014/0083695 A1 | 3/2014 | Nguyen | |
| 2015/0107844 A1* | 4/2015 | Gupta | C09K 8/725 507/221 |
| 2019/0256765 A1 | 8/2019 | Song et al. | |
| 2020/0199439 A1 | 6/2020 | Dugonjic-Bilic et al. | |
| 2020/0392397 A1 | 12/2020 | Dugonjic-Bilic et al. | |
| 2021/0024813 A1 | 1/2021 | Al-Taq et al. | |

OTHER PUBLICATIONS

International Search Report and Written Opinion mailed May 18, 2026 in PCT/US2026/011513.

* cited by examiner

*Primary Examiner* — Andrew Sue-Ako

(74) *Attorney, Agent, or Firm* — The Hilton Firm PLLC

(57) ABSTRACT

Compositions for foamed fracturing fluids and methods of using a foamed fracturing fluid. A foamed fracturing fluid is introduced into a wellbore penetrating the subterranean formation at a pressure sufficient to create and/or expand a fracture in the subterranean formation. The foamed fracturing fluid is a formulation of an aqueous base fluid, a polymeric gelling agent comprising acrylamide and phosphonate monomers, a hydration aid, a foaming agent, a crosslinker, a gel stabilizer, an oxidative breaker, a pH adjustor, and a gas constituent of carbon dioxide, nitrogen, or a combination of carbon dioxide and nitrogen. The polymeric gelling agent of the foamed fracturing fluids may be broken as described herein to then release a phosphonate degradation product. The phosphonate degradation product may persist in the wellbore to inhibit scale formation as the well is brought to production.

20 Claims, 8 Drawing Sheets

(a) FOAMED FLUID WITH CROSSLINKER 1

(b) FOAMED FLUID WITH CROSSLINKER 2

(a) TIME = 0, T = 70°F (b) TIME = 10 MIN, T = 70°F (c) TIME = 2 HOUR, T = 250°F

LINEAR GEL

| 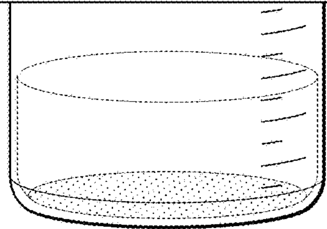 | 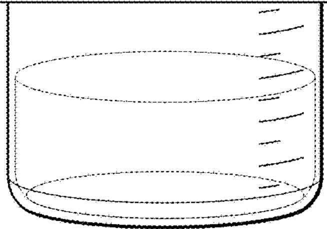 | 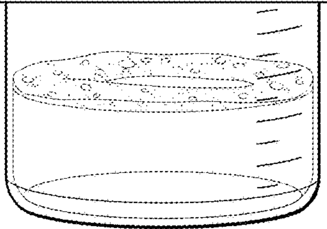 | 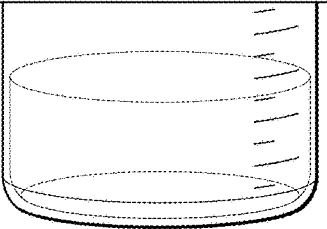 |
|---|---|---|---|
| (a) BLANK MATRIX ($Ba^{2+}$/$SO4^{2-}$, NO FRAC FLUID) DEMO: SCALE FORMATION W/O SCALE PROTECTION | (b) CONTROL MATRIX ($Ba^{2+}$/ FRAC FLUID, NO $SO4^{2-}$) DEMO: THE GOAL FOR NO SCALE FORMATION | (c) 2 GPT BROKEN FLUID ($Ba^{2+}$/$SO4^{2-}$, AND FRAC FLUID WITH SCALE PROTECT. FUNCTION) DEMO: GEL SUCCESSORS PREVENTED SCALE FORMATION | (d) 4 GPT BROKEN FLUID ($Ba^{2+}$/$SO4^{2-}$, AND FRAC FLUID WITH SCALE PROTECT. FUNCTION) DEMO: GEL SUCCESSORS PREVENTED SCALE FORMATION |

CROSSLINKED FLUID

| 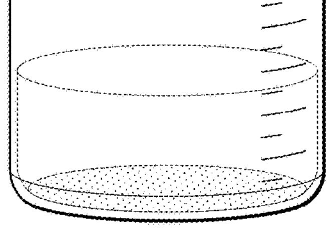 | 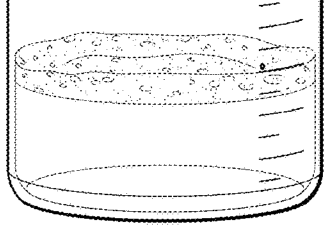 | 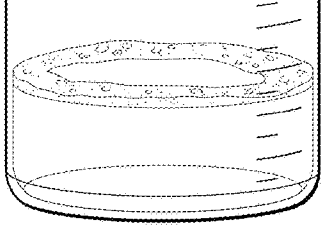 | 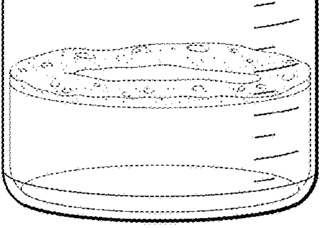 |
|---|---|---|---|
| (a) BLANK MATRIX ($Ba^{2+}$/$SO4^{2-}$, NO FRAC FLUID) DEMO: SCALE FORMATION W/O SCALE PROTECTION | (b) CONTROL MATRIX ($Ba^{2+}$/ FRAC FLUID, NO $SO4^{2-}$) DEMO: THE GOAL FOR NO SCALE FORMATION | (c) 2 GPT BROKEN FLUID ($Ba^{2+}$/$SO4^{2-}$, AND FRAC FLUID WITH SCALE PROTECT. FUNCTION) DEMO: GEL SUCCESSORS PREVENTED SCALE FORMATION | (d) 4 GPT BROKEN FLUID ($Ba^{2+}$/$SO4^{2-}$, AND FRAC FLUID WITH SCALE PROTECT. FUNCTION) DEMO: GEL SUCCESSORS PREVENTED SCALE FORMATION |

SCALING CONDITIONS: Ba 245 ppm, Ca 3900 ppm, Sr 200 ppm, SULFATE 50 ppm,TEMPERATURE AT 80°F

FIG. 8

FOAMED FRACTURING FLUID WITH SCALE PROTECTION

TECHNICAL FIELD

The present disclosure relates generally to wellbore operations, and more particularly, to the use of a foamed fracturing fluid with a polymeric gelling agent that degrades to help prevent mineral scale formation in the wellbore.

BACKGROUND

Hydrocarbon-bearing subterranean formations may be stimulated by hydraulic fracturing operations which may use a fracturing fluid to fracture the subterranean formation. A general fracturing operation may comprise pumping a fracturing fluid at a pressure above the fracture gradient of the subterranean formation. This pressurized fracturing fluid may then contact the subterranean formation to form a fracture therein. Some fracturing fluids utilize polymeric gelling agents to maintain a minimum viscosity during the fracturing operation. For some fracturing operations, foamed fracturing fluids may be used in conjunction with the polymeric gelling agents. Foamed fracturing fluids may be foamed using a foaming agent and a gas constituent such as carbon dioxide or nitrogen. Some gas constituents may increase the acidity of the wellbore conditions which may also increase mineral scale formation. Crosslinkers used to crosslink the polymeric gelling agent may negatively impact some scale inhibitors, and vice versa. Moreover, higher temperature wellbores may impact the functionality of some polymeric gelling agents.

The use of foamed fracturing fluids may be of particular importance for some subterranean formations and wellbore operations. The present invention provides improved compositions and methods for formulating and using foamed fracturing fluids.

BRIEF DESCRIPTION OF THE DRAWINGS

Illustrative examples of the present disclosure are described in detail below with reference to the attached drawing figures, which are incorporated by reference herein, and wherein:

FIG. 8 is an illustration of the scaling protection from foamed fracturing fluids prepared in two different ways in accordance with one or more examples described herein.

Figure 1:
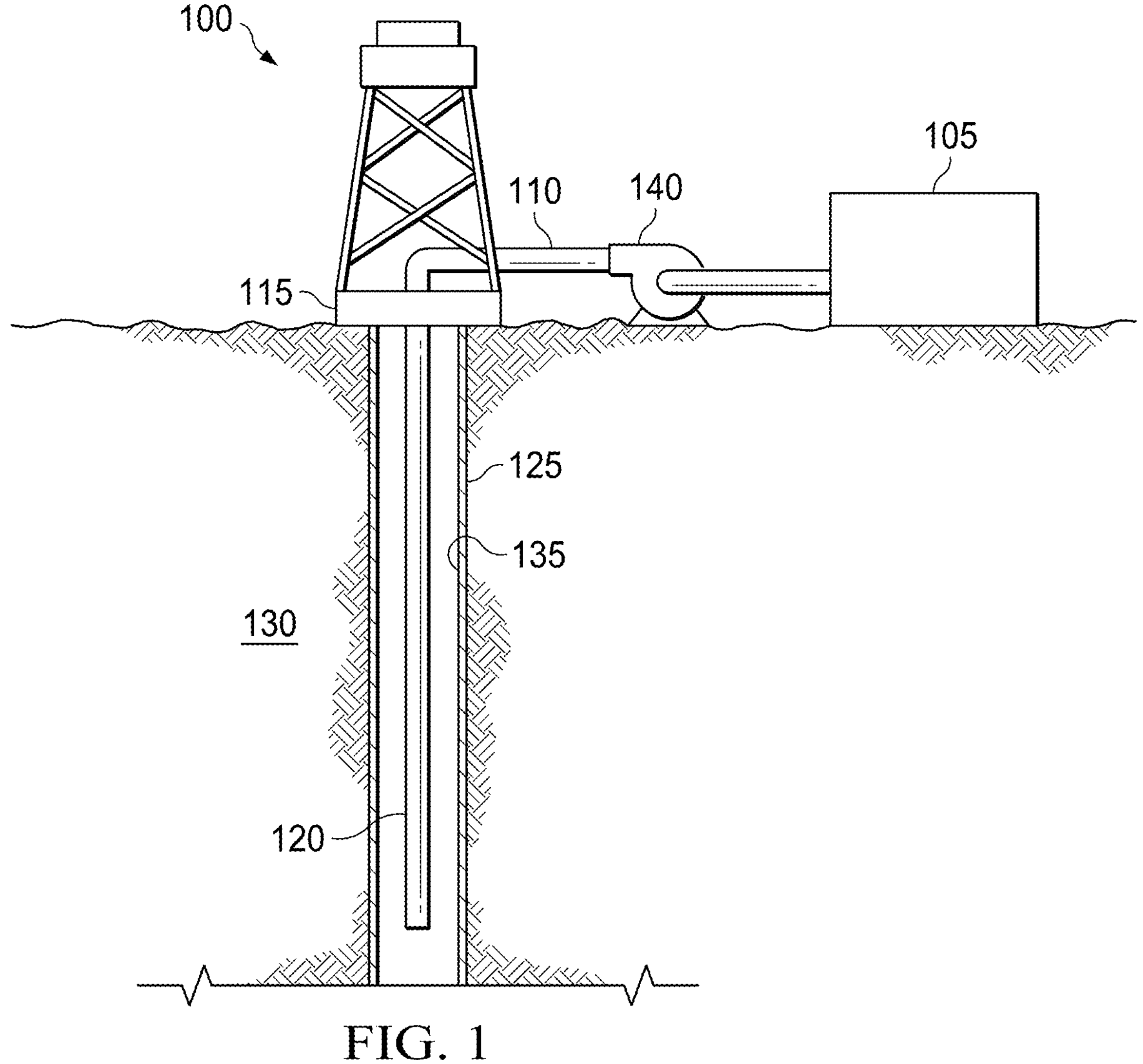
FIG. 1 is a schematic of the surface and near-surface portions of a system that delivers a foamed fracturing fluid to a downhole location in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to the use of a foamed fracturing fluid with a polymeric gelling agent that degrades to help prevent scale formation in the wellbore.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term “about.” Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when “about” is at the beginning of a numerical list, “about” modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms “including” and “comprising” are used in an open-ended fashion, and thus should be interpreted to mean “including, but not limited to.” Unless otherwise indicated, as used throughout this document, “or” does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The terms upstream and downstream may be used to refer to the location of various components relative to one another in regards to the flow of a sample through said components. For example, a first component described as upstream from a second component will encounter a sample before the downstream second component encounters the sample. Similarly, a first component described as being downstream from a second component will encounter the sample after the upstream second component encounters the sample.

As used herein the weight/volume ("w/v") is to be understood to mean the grams/milliliters and the weight/volume percentage ("% w/v") is to be understood to mean the grams/milliliters multiplied by 100.

The present disclosure relates generally to wellbore operations, and more particularly, to the use of a foamed fracturing fluid with a polymeric gelling agent that degrades to help prevent scale formation in the wellbore. Advantageously, the foamed fracturing fluid utilizes a polymeric gelling agent that is stable at higher temperatures and lower pH values. For example, the polymeric gelling agent maintains sufficient viscosity for use in fracturing operations, and in particular, when used in foamed fracturing fluids that may increase the acidity of downhole conditions. In a specific example, a foamed fracturing fluid utilizing $CO_2$ as the gas constituent may induce increasingly acidic conditions downhole. The polymeric gelling agent remains stable under acidic conditions even as the wellbore temperature increases. As a further advantage, the polymeric gelling agent may degrade when purposefully induced by a breaker. Degradation of the polymeric gelling agent releases molecules that may mitigate potential scaling issues in the wellbore. These molecules with scale inhibition function are released after the polymeric gelling agent has already been crosslinked and as such, the released scale inhibitors may avoid negative interactions with the crosslinkers, and in particular, metallic crosslinkers. Advantageously, the foamed fracturing fluid may be used as a single fluid complete stimulation treatment that also provides effective scale prevention even at high temperatures.

The foamed fracturing fluids may be used to create and/or enhance a fracture in a subterranean formation. In some optional examples, the foamed fracturing fluids may be used to transport proppant into the fracture. The foamed fracturing fluids have several advantages in fracturing operations. The foamed fracturing fluids may contain less liquid than comparable non-foamed fluids which may result in a decreased tendency to leak off. Similarly, the foamed fracturing fluids may have less liquid to retrieve after the fracturing operation is completed. The foamed fracturing fluids may also function as a diverting agent to enhance the formation of a complex fracture network as the foamed fracturing fluid penetrates the secondary fractures from off of the primary fracture. The polymeric gelling agent of the foamed fracturing fluids may be broken as described herein to then release a phosphonate degradation product. The phosphonate degradation product may persist in the wellbore to inhibit scale formation as the well is brought to production.

The foamed fracturing fluid comprises a polymeric gelling agent. The polymeric gelling agent is a copolymer comprising acrylamide and phosphonate monomers or a terpolymer comprising acrylamide and phosphonate monomers and an additional third monomer. The acrylamide monomer comprises the following structure:

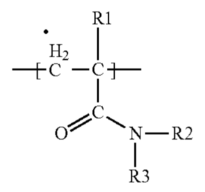

Where R1, R2, and R3 are independently hydrogen or a C1-C6 alkyl. The phosphonate monomer comprises the following structure:

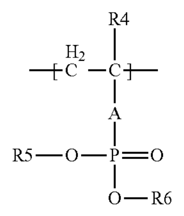

Where R4 is a hydrogen or a C1-C6 alkyl. R5 and R6 are independently hydrogen, a cation of an alkaline metal, a cation of an alkaline earth metal, a cation of ammonia, or a cation of an organic amine. A is a covalent C—P bond or a two-valent bridging group.

If the polymeric gelling agent is a terpolymer, the third monomer may include, but is not limited to, a sulfonate monomer, a 2-acrylamido-2-methylpropane-sulfonic acid monomer, an N-vinylamide monomer, acrylic acid, maleic acid, a methacrylic acid-based monomer, derivatives thereof, or any combination thereof. If the third monomer is a sulfonate monomer, the sulfonate monomer comprises the following structure:

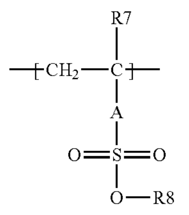

Where R7 is hydrogen or a C1-C6 alkyl. R8 is hydrogen, a cation of an alkaline metal, a cation of an alkaline earth metal, a cation of ammonia, or a cation of an organic amine.

The polymeric gelling agent may be crosslinked with a crosslinker to increase the viscosity of the foamed fracturing fluid. The polymeric gelling agent is crosslinked to a degree sufficient to achieve a desired viscosity for the fracturing operation. In some examples, the viscosity achieved may be equal to or greater than 100 centipoise at a shear rate of 170 l/s. The polymeric gelling agent remains thermally stable at high temperatures and may be used in wellbores having bottom hole temperatures of up to about 500° F. For example, the bottom hole temperature of the wellbore may be about 250° F. to about 500° F. Other gelling agents may prematurely degrade and lose viscosity in this temperature range. In some examples, the foamed fracturing fluid does not comprise other gelling agents such as polysaccharides like guar.

The concentration of the polymeric gelling agent in a foamed fracturing fluid may range from about 0.025% w/v to about 20% w/v. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the polymeric gelling agent in a foamed fracturing fluid may range from about 0.025% (w/v) to about 20% (w/v), from about 0.05% (w/v) to about 20% (w/v), from about 0.075% (w/v) to about 20% (w/v), from about 0.1% (w/v) to about 20% (w/v), from about 0.5% (w/v) to about 20% (w/v), from about 1% (w/v) to about 20% (w/v), from about 2% (w/v) to about 20% (w/v), from about 3% (w/v) to about 20% (w/v), from about 4% (w/v) to about 20% (w/v), from about 5% (w/v) to about 20% (w/v), from about 6% (w/v) to about 20% (w/v), from about 7% (w/v) to about 20% (w/v), from about 8% (w/v) to about 20% (w/v), from about 9% (w/v) to about 20% (w/v), from about 10% (w/v) to about 20% (w/v), from about 11% (w/v) to about 20% (w/v), from about 12% (w/v) to about 20% (w/v), from about 13% (w/v) to about 20% (w/v), from about 14% (w/v) to about 20% (w/v), from about 15% (w/v) to about 20% (w/v), from about 16% (w/v) to about 20% (w/v), from about 17% (w/v) to about 20% (w/v), from about 18% (w/v) to about 20% (w/v), or from about 19% (w/v) to about 20% (w/v). As another example, the concentration of the polymeric gelling agent in a foamed fracturing fluid may range from about 0.025% (w/v) to about 20% (w/v), from about 0.025% (w/v) to about 19% (w/v), from about 0.025% (w/v) to about 18% (w/v), from about 0.025% (w/v) to about 17% (w/v), from about 0.025% (w/v) to about 16% (w/v), from about 0.025% (w/v) to about 15% (w/v), from about 0.025% (w/v) to about 14% (w/v), from about 0.025% (w/v) to about 13% (w/v), from about 0.025% (w/v) to about 12% (w/v), from about 0.025% (w/v) to about 11% (w/v), from about 0.025% (w/v) to about 10% (w/v), from about 0.025% (w/v) to about 9% (w/v), from about 0.025% (w/v) to about 8% (w/v), from about 0.025% (w/v) to about 7% (w/v), from about 0.025% (w/v) to about 6% (w/v), from about 0.025% (w/v) to about 5% (w/v), from about 0.025% (w/v) to about 4% (w/v), from about 0.025% (w/v) to about 3% (w/v), from about 0.025% (w/v) to about 2% (w/v), from about 0.025% (w/v) to about 1% (w/v), from about 0.025% (w/v) to about 0.5% (w/v), from about 0.025% (w/v) to about 0.1% (w/v), from about 0.025% (w/v) to about 0.075% (w/v), or from about 0.025% (w/v) to about 0.05% (w/v). With the benefit of this disclosure, one of ordinary skill in the art will be readily able to prepare a foamed fracturing fluid having a desirable concentration of polymeric gelling agent for use in a given wellbore operation.

The foamed fracturing fluids comprise a hydration aid to assist hydration of the polymeric gelling agent. Generally, the hydration aids have a hydrophilic-lipophilic balance of about 11 to about 13. Examples of the hydration aid may include, but are not limited to, alkylphenol alkoxylate, alkyl polyglucosides, alkoxylated alkylamines, alkoxylated primary alcohols, alkoxylated branched alcohols, or any combination of hydration aids.

The concentration of the hydration aid in a foamed fracturing fluid may range from about 0.025% w/v to about 20% w/v. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the hydration aid in a foamed fracturing fluid may range from about 0.025% (w/v) to about 20% (w/v), from about 0.05% (w/v) to about 20% (w/v), from about 0.075% (w/v) to about 20% (w/v), from about 0.1% (w/v) to about 20% (w/v), from about 0.5% (w/v) to about 20% (w/v), from about 1% (w/v) to about 20% (w/v), from about 2% (w/v) to about 20% (w/v), from about 3% (w/v) to about 20% (w/v), from about 4% (w/v) to about 20% (w/v), from about 5% (w/v) to about 20% (w/v), from about 6% (w/v) to about 20% (w/v), from about 7% (w/v) to about 20% (w/v), from about 8% (w/v) to about 20% (w/v), from about 9% (w/v) to about 20% (w/v), from about 10% (w/v) to about 20% (w/v), from about 11% (w/v) to about 20% (w/v), from about 12% (w/v) to about 20% (w/v), from about 13% (w/v) to about 20% (w/v), from about 14% (w/v) to about 20% (w/v), from about 15% (w/v) to about 20% (w/v), from about 16% (w/v) to about 20% (w/v), from about 17% (w/v) to about 20% (w/v), from about 18% (w/v) to about 20% (w/v), or from about 19% (w/v) to about 20% (w/v). As another example, the concentration of the hydration aid in a foamed fracturing fluid may range from about 0.025% (w/v) to about 20% (w/v), from about 0.025% (w/v) to about 19% (w/v), from about 0.025% (w/v) to about 18% (w/v), from about 0.025% (w/v) to about 17% (w/v), from about 0.025% (w/v) to about 16% (w/v), from about 0.025% (w/v) to about 15% (w/v), from about 0.025% (w/v) to about 14% (w/v), from about 0.025% (w/v) to about 13% (w/v), from about 0.025% (w/v) to about 12% (w/v), from about 0.025% (w/v) to about 11% (w/v), from about 0.025% (w/v) to about 10% (w/v), from about 0.025% (w/v) to about 9% (w/v), from about 0.025% (w/v) to about 8% (w/v), from about 0.025% (w/v) to about 7% (w/v), from about 0.025% (w/v) to about 6% (w/v), from about 0.025% (w/v) to about 5% (w/v), from about 0.025% (w/v) to about 4% (w/v), from about 0.025% (w/v) to about 3% (w/v), from about 0.025% (w/v) to about 2% (w/v), from about 0.025% (w/v) to about 1% (w/v), from about 0.025% (w/v) to about 0.5% (w/v), from about 0.025% (w/v) to about 0.1% (w/v), from about 0.025% (w/v) to about 0.075% (w/v), or from about 0.025% (w/v) to about 0.05% (w/v). With the benefit of this disclosure, one of ordinary skill in the art will be readily able to prepare a foamed fracturing fluid having a desirable concentration of hydration aid for use in a given wellbore operation.

The foamed fracturing fluid comprises a foaming agent. The foaming agent may be used in conjunction with the gas constituent to foam the fracturing fluid and to achieve a desired foam quality. Generally, the foaming agent is used in the foamed fracturing fluid to promote and stabilize the gas-liquid dispersions. Some examples of the foaming agents may be soap-like molecules (e.g., surfactants) containing a long hydrophobic paraffin chain with a hydrophilic end group. General examples of the foaming agents may include, but are not limited to, cationic, anionic, nonionic or amphoteric compounds. Specific examples of the foaming agents may include, but are not limited to, betaines, sulfated or sulfonated alkoxylates, alkyl quaternary amines, alkoxylates of linear alcohols, alkyl sulfonates, alkyl aryl sulfonates, C10-C20 alkyl diphenyl ether sulfonates, nonionic alkyl amines, anionic surfactant aliphatic sulfonic acid, the like, salts thereof, derivatives thereof, or any combinations of foaming agents.

The concentration of the foaming agent in a foamed fracturing fluid may range from about 0.025% w/v to about 10% w/v. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the foaming agent in a foamed fracturing fluid may range from about 0.025% (w/v) to about 10% (w/v), from about 0.05% (w/v) to about 10% (w/v), from about 0.075% (w/v) to about 10% (w/v), from about 0.1% (w/v) to about 10% (w/v), from about 0.5% (w/v) to about 10% (w/v), from about 1% (w/v) to about 10% (w/v), from about 2% (w/v) to about 10% (w/v), from about 3% (w/v) to about 10% (w/v), from about 4% (w/v) to about 10% (w/v), from about 5% (w/v) to about 10% (w/v), from about 6% (w/v) to about 10% (w/v), from about 7% (w/v) to about 10% (w/v), from about 8% (w/v) to about 10% (w/v), or from about 9% (w/v) to about 10% (w/v). As another example, the concentration of the foaming agent in a foamed fracturing fluid may range from about 0.025% (w/v) to about 10% (w/v), from about 0.025% (w/v) to about 9% (w/v), from about 0.025% (w/v) to about 8% (w/v), from about 0.025% (w/v) to about 7% (w/v), from about 0.025% (w/v) to about 6% (w/v), from about 0.025% (w/v) to about 5% (w/v), from about 0.025% (w/v) to about 4% (w/v), from about 0.025% (w/v) to about 3% (w/v), from about 0.025% (w/v) to about 2% (w/v), from about 0.025% (w/v) to about 1% (w/v), from about 0.025% (w/v) to about 0.5% (w/v), from about 0.025% (w/v) to about 0.1% (w/v), from about 0.025% (w/v) to about 0.075% (w/v), or from about 0.025% (w/v) to about 0.05% (w/v). With the benefit of this disclosure, one of ordinary skill in the art will be readily able to prepare a foamed fracturing fluid having a desirable concentration of foaming agent for use in a given wellbore operation.

The foamed fracturing fluid comprises a crosslinker. The crosslinker may be used to crosslink the polymer of the polymeric gelling agent resulting in a gel having a desired viscosity for the foamed fracturing fluid. Metal crosslinkers are preferred with general examples including, but not limited to, polyvalent ions including zirconium, titanium, aluminum, chromium, iron, or any other combination of metal crosslinking agent. Specific examples of the crosslinking agent may include, but are not limited to, zirconium IV ions, tetra-N-propyl zirconate, zirconyl chloride, zirconium sulfate, titanium isoproxide with triethanol amine, derivatives thereof, or combinations of crosslinking agents. As the scaling agents produced from the degradation of the polymeric agent (e.g., the phosphonate degradation products) are released after the polymeric gelling agent has already been crosslinked, the amount of free crosslinker present in the foamed fracturing fluid is reduced and negative interactions between the crosslinker and the released scaling agent are minimized.

In some examples, multiple crosslinkers may be used and timed to crosslink at different intervals. For example, a foamed fracturing fluid may include two crosslinkers where one is used as an instant crosslinker and the second is used as a delayed crosslinker.

The concentration of the crosslinker in a foamed fracturing fluid may range from about 0.005% w/v to about 10% w/v. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the crosslinker in a foamed fracturing fluid may range from about 0.005% (w/v) to about 10% (w/v), from about 0.0075% (w/v) to about 10% (w/v), from about 0.01% (w/v) to about 10% (w/v), from about 0.05% (w/v) to about 10% (w/v), from about 0.075% (w/v) to about 10% (w/v), from about 0.1% (w/v) to about 10% (w/v), from about 0.5% (w/v) to about 10% (w/v), from about 1% (w/v) to about 10% (w/v), from about 2% (w/v) to about 10% (w/v), from about 3% (w/v) to about 10% (w/v), from about 4% (w/v) to about 10% (w/v), from about 5% (w/v) to about 10% (w/v), from about 6% (w/v) to about 10% (w/v), from about 7% (w/v) to about 10% (w/v), from about 8% (w/v) to about 10% (w/v), or from about 9% (w/v) to about 10% (w/v). As another example, the concentration of the crosslinker in a foamed fracturing fluid may range from about 0.005% (w/v) to about 10% (w/v), from about 0.005% (w/v) to about 9% (w/v), from about 0.005% (w/v) to about 8% (w/v), from about 0.005% (w/v) to about 7% (w/v), from about 0.005% (w/v) to about 6% (w/v), from about 0.005% (w/v) to about 5% (w/v), from about 0.005% (w/v) to about 4% (w/v), from about 0.005% (w/v) to about 3% (w/v), from about 0.005% (w/v) to about 2% (w/v), from about 0.005% (w/v) to about 1% (w/v), from about 0.005% (w/v) to about 0.75% (w/v), from about 0.005% (w/v) to about 0.5% (w/v), from about 0.005% (w/v) to about 0.25% (w/v), from about 0.005% (w/v) to about 0.1% (w/v), from about 0.005% (w/v) to about 0.075% (w/v), from about 0.005% (w/v) to about 0.05% (w/v), from about 0.005% (w/v) to about 0.025% (w/v), from about 0.005% (w/v) to about 0.01% (w/v), or from about 0.005% (w/v) to about 0.0075% (w/v). With the benefit of this disclosure, one of ordinary skill in the art will be readily able to prepare a foamed fracturing fluid having a desirable concentration of crosslinker for use in a given wellbore operation.

The foamed fracturing fluid comprises a breaker. The breaker may be used to degrade the polymer of the polymeric gelling agent resulting in a release of the scaling agent degradation product, (e.g., a phosphonate degradation product). General examples of the breaker include, but are not limited to, persulfates, perborates, percarbonates, peroxides, bromates, chlorites, N- and O-acyl compounds, diacyl peroxides, peroxy dicarbonates, dialkyl peroxides, alkyl hydroperoxides, esters of peracids, or any combinations of breakers. Specific examples of the breaker may include, but not limit to, sodium chlorite, sodium chlorate, sodium bromate, sodium persulphate, dichromate, permanganates, peroxydisulfate, sodium perborate, sodium carbonate peroxide, sodium perborate, sodium percarbonate, ammonium persulfate, potassium persulfate, magnesium peroxide, hydrogen peroxide, tert-Butyl hydroperoxide, the like, derivatives thereof, or any combinations of breakers. In some optional examples, an encapsulated breaker may be added into the fluid to slowly release the action of the breaker. In some optional examples, a breaker catalyst may be added to accelerate the action of the breaker. Examples of the breaker catalyst may include, but are not limited to, EDTA/copper chelate, diethylenetriamine, cobalt acetate, the like, derivatives thereof, or any combinations of breaker catalysts.

The concentration of the breaker in a foamed fracturing fluid may range from about 0.01% w/v to about 25% w/v. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the breaker in a foamed fracturing fluid may range from about 0.01% (w/v) to about 25% (w/v), from about 0.05% (w/v) to about 25% (w/v), from about 0.1% (w/v) to about 25% (w/v), from about 0.5% (w/v) to about 25% (w/v), from about 1% (w/v) to about 25% (w/v), from about 2% (w/v) to about 25% (w/v), from about 3% (w/v) to about 25% (w/v), from about 4% (w/v) to about 25% (w/v), from about 5% (w/v) to about 25% (w/v), from about 6% (w/v) to about 25% (w/v), from about 7% (w/v) to about 25% (w/v), from about 8% (w/v) to about 25% (w/v), from about 9% (w/v) to about 25% (w/v), from about 10% (w/v) to about 25% (w/v), from about 11% (w/v) to about 25% (w/v), from about 12% (w/v) to about 25% (w/v), from about 13% (w/v) to about 25% (w/v), from about 14% (w/v) to about 25% (w/v), from about 15% (w/v) to about 25% (w/v), from about 16% (w/v) to about 25% (w/v), from about 17% (w/v) to about 25% (w/v), from about 18% (w/v) to about 25% (w/v), from about 19% (w/v) to about 25% (w/v), from about 20% (w/v) to about 25% (w/v), from about 21% (w/v) to about 25% (w/v), from about 22% (w/v) to about 25% (w/v), from about 23% (w/v) to about 25% (w/v), or from about 24% (w/v) to about 25% (w/v). As another example, the concentration of the breaker in a foamed fracturing fluid may range from about 0.01% (w/v) to about 25% (w/v), from about 0.01% (w/v) to about 24% (w/v), from about 0.01% (w/v) to about 23% (w/v), from about 0.01% (w/v) to about 22% (w/v), from about 0.01% (w/v) to about 21% (w/v), from about 0.01% (w/v) to about 20% (w/v), from about 0.01% (w/v) to about 19% (w/v), from about 0.01% (w/v) to about 18% (w/v), from about 0.01% (w/v) to about 17% (w/v), from about 0.01% (w/v) to about 16% (w/v), from about 0.01% (w/v) to about 15% (w/v), from about 0.01% (w/v) to about 14% (w/v), from about 0.01% (w/v) to about 13% (w/v), from about 0.01% (w/v) to about 12% (w/v), from about 0.01% (w/v) to about 11% (w/v), from about 0.01% (w/v) to about 10% (w/v), from about 0.01% (w/v) to about 9% (w/v), from about 0.01% (w/v) to about 8% (w/v), from about 0.01% (w/v) to about 7% (w/v), from about 0.01% (w/v) to about 6% (w/v), from about 0.01% (w/v) to about 5% (w/v), from about 0.01% (w/v) to about 4% (w/v), from about 0.01% (w/v) to about 3% (w/v), from about 0.01% (w/v) to about 2% (w/v), from about 0.01% (w/v) to about 1% (w/v), from about 0.01% (w/v) to about 0.5% (w/v), from about 0.01% (w/v) to about 0.1% (w/v), or from about 0.01% (w/v) to about 0.05% (w/v). With the benefit of this disclosure, one of ordinary skill in the art will be readily able to prepare a foamed fracturing fluid having a desirable concentration of breaker for use in a given wellbore operation.

Examples of the foamed fracturing fluids comprise a gel stabilizer to reduce oxidation of the other components of the fracturing fluid and increase gel stability. Examples of the gel stabilizer may include, but are not limited to, sodium thiosulfate, erythorbic acid, ascorbic acid, isoascorbic acid, alkali metal salts, or any combination of gel stabilizer.

The concentration of the gel stabilizer in a foamed fracturing fluid may range from about 0.01% w/v to about 25% w/v. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the gel stabilizer in a foamed fracturing fluid may range from about 0.01% (w/v) to about 25% (w/v), from about 0.05% (w/v) to about 25% (w/v), from about 0.1% (w/v) to about 25% (w/v), from about 0.5% (w/v) to about 25% (w/v), from about 1% (w/v) to about 25% (w/v), from about 2% (w/v) to about 25% (w/v), from about 3% (w/v) to about 25% (w/v), from about 4% (w/v) to about 25% (w/v), from about 5% (w/v) to about 25% (w/v), from about 6% (w/v) to about 25% (w/v), from about 7% (w/v) to about 25% (w/v), from about 8% (w/v) to about 25% (w/v), from about 9% (w/v) to about 25% (w/v), from about 10% (w/v) to about 25% (w/v), from about 11% (w/v) to about 25% (w/v), from about 12% (w/v) to about 25% (w/v), from about 13% (w/v) to about 25% (w/v), from about 14% (w/v) to about 25% (w/v), from about 15% (w/v) to about 25% (w/v), from about 16% (w/v) to about 25% (w/v), from about 17% (w/v) to about 25% (w/v), from about 18% (w/v) to about 25% (w/v), from about 19% (w/v) to about 25% (w/v), from about 20% (w/v) to about 25% (w/v), from about 21% (w/v) to about 25% (w/v), from about 22% (w/v) to about 25% (w/v), from about 23% (w/v) to about 25% (w/v), or from about 24% (w/v) to about 25% (w/v). As another example, the concentration of the gel stabilizer in a foamed fracturing fluid may range from about 0.01% (w/v) to about 25% (w/v), from about 0.01% (w/v) to about 24% (w/v), from about 0.01% (w/v) to about 23% (w/v), from about 0.01% (w/v) to about 22% (w/v), from about 0.01% (w/v) to about 21% (w/v), from about 0.01% (w/v) to about 20% (w/v), from about 0.01% (w/v) to about 19% (w/v), from about 0.01% (w/v) to about 18% (w/v), from about 0.01% (w/v) to about 17% (w/v), from about 0.01% (w/v) to about 16% (w/v), from about 0.01% (w/v) to about 15% (w/v), from about 0.01% (w/v) to about 14% (w/v), from about 0.01% (w/v) to about 13% (w/v), from about 0.01% (w/v) to about 12% (w/v), from about 0.01% (w/v) to about 11% (w/v), from about 0.01% (w/v) to about 10% (w/v), from about 0.01% (w/v) to about 9% (w/v), from about 0.01% (w/v) to about 8% (w/v), from about 0.01% (w/v) to about 7% (w/v), from about 0.01% (w/v) to about 6% (w/v), from about 0.01% (w/v) to about 5% (w/v), from about 0.01% (w/v) to about 4% (w/v), from about 0.01% (w/v) to about 3% (w/v), from about 0.01% (w/v) to about 2% (w/v), from about 0.01% (w/v) to about 1% (w/v), from about 0.01% (w/v) to about 0.5% (w/v), from about 0.01% (w/v) to about 0.1% (w/v), or from about 0.01% (w/v) to about 0.05% (w/v). With the benefit of this disclosure, one of ordinary skill in the art will be readily able to prepare a foamed fracturing fluid having a desirable concentration of gel stabilizer for use in a given wellbore operation.

The foamed fracturing fluid comprises a gas constituent of carbon dioxide, nitrogen, or a combination of carbon dioxide and nitrogen. The gas constituent is used in conjunction with the foaming agent to foam the fracturing fluid and to achieve a desired foam quality. Generally, a sufficient volume of the gas constituent is added to achieve a foam quality of between about 10 to about 90%. Foam quality is the ratio of gas volume to foam volume (gas+liquid) over a given pressure and temperature (e.g., the downhole conditions) and is generally a measure of the volume of entrained gas within the foamed fluid.

The foamed fracturing fluid comprises an aqueous base fluid. Examples of the aqueous base fluid may include, but are not limited to, freshwater, saltwater (e.g., water containing one or more salts dissolved therein), brine (e.g., saturated saltwater, including saturated saltwater produced from subterranean formations), brackish water, seawater, or any combination thereof. Generally, the aqueous base fluid may be from any source provided that the water does not contain an excess of compounds that may undesirably affect other components in the foamed fracturing fluid. In the case of brines, the brine may comprise a monovalent brine or a divalent brine. Suitable monovalent brines may include, for example, sodium chloride brines, sodium bromide brines, sodium acetate brines, sodium formate brines, potassium chloride brines, potassium bromide brines, potassium acetate brines, potassium formate brines, ammonium-containing brines such as ammonium chloride, ammonium bromide, ammonium nitrate, ammonium nitrite, ammonium acetate, ammonium formate, ammonium sulfate, ammonium carbonate, and ammonium hydroxide, and the like. Suitable divalent brines may include, for example, magnesium chloride brines, calcium chloride brines, calcium bromide brines, zinc bromide brines, and the like. One of ordinary skill in the art, with the benefit of this disclosure, should be readily able to select an aqueous base fluid for a chosen application.

The concentration of the aqueous base fluid in the foamed fracturing fluid may range from about 1% (w/v) to about 99% (w/v). The concentration of the aqueous base fluid in the foamed fracturing fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous base fluid in the foamed fracturing fluid may range from about 1% (w/v) to about 99% (w/v), from about 5% (w/v) to about 99% (w/v), from about 10% (w/v) to about 99% (w/v), from about 15% (w/v) to about 99% (w/v), from about 20% (w/v) to about 99% (w/v), from about 25% (w/v) to about 99% (w/v), from about 30% (w/v) to about 99% (w/v), from about 35% (w/v) to about 99% (w/v), from about 40% (w/v) to about 99% (w/v), from about 45% (w/v) to about 99% (w/v), from about 55% (w/v) to about 99% (w/v), from about 60% (w/v) to about 99% (w/v), from about 65% (w/v) to about 99% (w/v), from about 70% (w/v) to about 99% (w/v), from about 75% (w/v) to about 99% (w/v), from about 80% (w/v) to about 99% (w/v), from about 85% (w/v) to about 99% (w/v), from about 90% (w/v) to about 99% (w/v), or from about 95% (w/v) to about 99% (w/v). As another example, the concentration of the aqueous base fluid in the foamed fracturing fluid may range from about 1% (w/v) to about 99% (w/v), from about 1% (w/v) to about 95% (w/v), from about 1% (w/v) to about 90% (w/v), from about 1% (w/v) to about 85% (w/v), from about 1% (w/v) to about 80% (w/v), from about 1% (w/v) to about 75% (w/v), from about 1% (w/v) to about 70% (w/v), from about 1% (w/v) to about 65% (w/v), from about 1% (w/v) to about 60% (w/v), from about 1% (w/v) to about 55% (w/v), from about 1% (w/v) to about 50% (w/v), from about 1% (w/v) to about 45% (w/v), from about 1% (w/v) to about 40% (w/v), from about 1% (w/v) to about 35% (w/v), from about 1% (w/v) to about 30% (w/v), from about 1% (w/v) to about 25% (w/v), from about 1% (w/v) to about 20% (w/v), from about 1% (w/v) to about 15% (w/v), from about 1% (w/v) to about 10% (w/v), or from about 1% (w/v) to about 5% (w/v). With the benefit of this disclosure, one of ordinary skill in the art will be able to prepare a foamed fracturing fluid having a sufficient concentration of an aqueous base fluid for a given application.

Optionally, the foamed fracturing fluid may comprise a proppant to, among other reasons, be placed within fractures in the formation. Examples of suitable proppant may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof.

The concentration of the proppant in the foamed fracturing fluid may range from about 0.1 to about 10 lbs./gal. It is to be understood that the concentration of the proppant varies depending on the location of the foamed fracturing fluid in the system and the noted concentration range of the proppant is calculated at bottom hole conditions which are at a higher pressure than at the surface. The concentration of the proppant in the foamed fracturing fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the proppant in the foamed fracturing fluid may range from about 0.1 to about 10 lbs./gal, from about 0.5 to about 10 lbs./gal, from about 1 to about 10 lbs./gal, from about 2 to about 10 lbs./gal, from about 3 to about 10 lbs./gal, from about 4 to about 10 lbs./gal, from about 5 to about 10 lbs./gal, from about 6 to about 10 lbs./gal, from about 7 to about 10 lbs./gal, from about 8 to about 10 lbs./gal, or from about 9 to about 10 lbs./gal. As another example, the concentration of the proppant in the foamed fracturing fluid may range from about 0.1 to about 10 lbs./gal, from about 0.1 to about 9 lbs./gal, from about 0.1 to about 8 lbs./gal, from about 0.1 to about 7 lbs./gal, from about 0.1 to about 6 lbs./gal, from about 0.1 to about 5 lbs./gal, from about 0.1 to about 4 lbs./gal, from about 0.1 to about 3 lbs./gal, from about 0.1 to about 2 lbs./gal, from about 0.1 to about 1 lbs./gal, or from about 0.1 to about 0.5 lbs./gal. With the benefit of this disclosure, one of ordinary skill in the art will be able to prepare a foamed fracturing fluid having a sufficient concentration of proppant for a given application.

In some optional examples, the proppant may comprise one or more microproppants to, among other reasons, be placed within microfractures in the formation. The microproppant may have an average size of less than about 100 mesh per the US Sieve Series. Examples of microproppants may include, but are not limited to, fly ash, silica, alumina, fumed carbon, carbon black, graphite, mica, titanium dioxide, metal-silicate, silicate, kaolin, talc, zirconia, boron, hollow microspheres, glass, calcined clays, partially calcined clays, or any combination of microproppants.

The concentration of the microproppant in the foamed fracturing fluid may range from about 0.01 to about 10 lbs./gal. The concentration of the microproppant in the foamed fracturing fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the microproppant in the foamed fracturing fluid may range from about 0.01 to about 10 lbs./gal, from about 0.05 to about 10 lbs./gal, from about 0.1 to about 10 lbs./gal, from about 0.5 to about 10 lbs./gal, from about 1 to about 10 lbs./gal, from about 2 to about 10 lbs./gal, from about 3 to about 10 lbs./gal, from about 4 to about 10 lbs./gal, from about 5 to about 10 lbs./gal, from about 6 to about 10 lbs./gal, from about 7 to about 10 lbs./gal, from about 8 to about 10 lbs./gal, or from about 9 to about 10 lbs./gal. As another example, the concentration of the proppant in the foamed fracturing fluid may range from about 0.01 to about 10 lbs./gal, from about 0.01 to about 9 lbs./gal, from about 0.01 to about 8 lbs./gal, from about 0.01 to about 7 lbs./gal, from about 0.01 to about 6 lbs./gal, from about 0.01 to about 5 lbs./gal, from about 0.01 to about 4 lbs./gal, from about 0.01 to about 3 lbs./gal, from about 0.01 to about 2 lbs./gal, from about 0.01 to about 1 lbs./gal, from about 0.01 to about 0.5 lbs./gal, from about 0.01 to about 0.1 lbs./gal, or from about 0.01 to about 0.05 lbs./gal. With the benefit of this disclosure, one of ordinary skill in the art will be able to prepare a foamed fracturing fluid having a sufficient concentration of proppant for a given application.

The foamed fracturing fluid comprises a pH in a range of about 2.5 to about 11. In some examples, the pH of the foamed fracturing fluid is preferred in a range of about 2.5 to about 6.5. A pH adjustor may be added to shift the pH to a desired range. The pH adjustor may be any material sufficient for adjusting the pH of the foamed fracturing fluid to a range of about 2.5 to about 11 without negatively impacting the functionality of the other foamed fracturing fluid components. Examples of the pH adjustor may include, but are not limited to, sulfamic acid, hydrochloric acid, sulfuric acid, sodium bisulfate, an organic acid ester including formate, lactate, and acetate derivatives, bicarbonate, carbonate, hydroxide, derivatives thereof, or any combination of pH adjustors.

In some optional examples, the foamed fracturing fluid may comprise an additive. The additive may be used to adjust a property of the foamed fracturing fluid, for example, the viscosity, density, etc. Examples of the additive may include, but are not limited to, silica scale control additives, corrosion inhibitors, surfactants, gel stabilizers, anti-oxidants, polymer degradation prevention additives, relative stimulations, scale inhibitors, foaming agents, defoaming agents, antifoaming agents, emulsifying agents, de-emulsifying agents, iron control agents, proppants or other particulates, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art will be able to formulate a foamed fracturing fluid having properties suitable for a desired application.

In some optional examples, the foamed fracturing fluid does not include a scale inhibitor except for the phosphonate degradation product generated by the degradation of the polymeric gelling agent. For example, the foamed fracturing fluid may not comprise a scale inhibitor at the time it is introduced into the wellbore. Examples of the excluded scale inhibitors may include, but are not limited to, amino trimethylene phosphonic acid (ATMP), 1-hydroxy ethane 1,1-diphosphonic acid (HEDP), amino tris(methylenephosphonic acid) (ATMP), ethylenediamine tetra(methylene phosphonic acid) (EDTMP), tetramethylenediamine tetra (methylene phosphonic acid) (TDTMP), hexamethylenediamine tetra(methylene phosphonic acid) (HDTMP), ethylene diamine tetra (methylene phosphonic acid) (EDTMPA), diethylenetriamine penta(methylene phosphonic acid) (DTPMP), bis(hexamethylene triamine penta (methylene phosphonic acid)) (BHMPTPMP), aminoethylethanolamine phosphonate (AEEA), or a combination thereof. In some optional examples, a scale inhibitor is not introduced into the wellbore during the fracturing operation utilizing the foamed fracturing fluid.

FIG. 1 illustrates a schematic of the surface and near-surface portions of a system 100 that delivers a foamed fracturing fluid to a downhole location, according to one or more examples described herein. It should be noted that while FIG. 1 generally depicts a land-based system, it is to be recognized that like systems may be operated in subsea locations as well. As depicted in FIG. 1, system 100 includes a mixing tank 105, in which a foamed fracturing fluid is formulated. The foamed fracturing fluid may be conveyed to a pump 140 which elevates the foamed fracturing fluid to a desired pressure to drive the foamed fracturing fluid to wellhead 115 via line 110, where the foamed fracturing fluid then enters conduit 120. Conduit 120 extends from wellhead 115 into a wellbore 125 penetrating subterranean formation 130. Wellhead 115 is illustrated as comprising a derrick, but it is to be understood that other wellhead 115 arrangements such as a Christmas tree may be used in some examples. Wellbore 125 may be any type of wellbore including vertical, horizontal, deviated, etc. In some examples, wellbore 125 is a wellbore of a geothermal well. The illustrated portion of wellbore 125 is cased with a casing 135. In some alternative examples, wellbore 125 may be uncased. Upon being ejected from conduit 120, the foamed fracturing fluid may subsequently enter the subterranean formation 130 as described in FIG. 2 below. Pump 140 is configured to raise the fluid pressure of the foamed fracturing fluid to a desired pressure before its introduction into conduit 120. The foamed fracturing fluid may be introduced into the wellbore 125 to create or enhance one or more fractures in subterranean formation 130.

Figure 2:
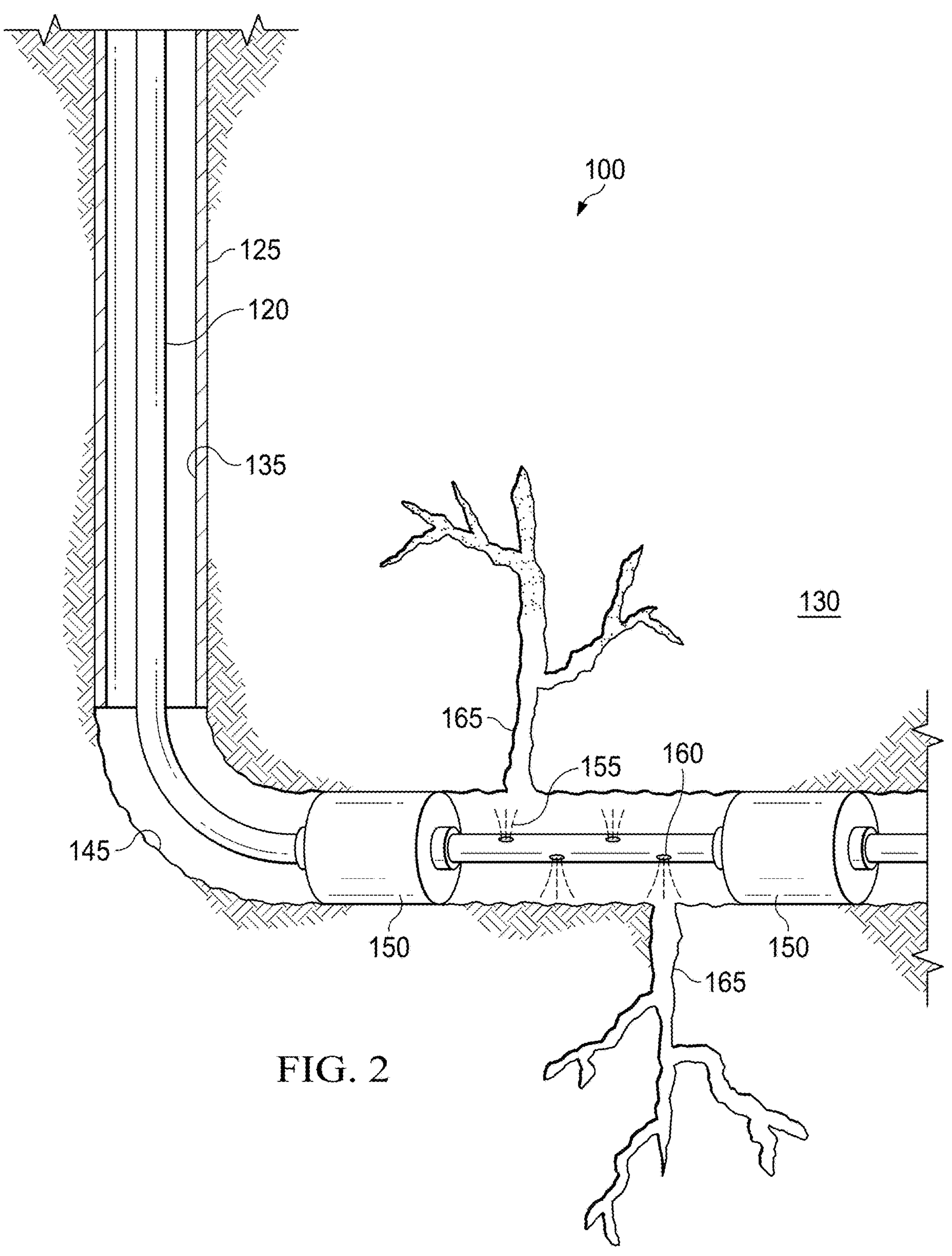
FIG. 2 is a schematic of the downhole portion of the system illustrated in FIG. 1 in accordance with one or more examples described herein.

FIG. 2 illustrates a schematic of the downhole portion of the system 100 illustrated in FIG. 1, according to one or more examples. In the example of FIG. 2, the foamed fracturing fluid is introduced into wellbore 125 to form or enhance one or more fractures in subterranean formation 130. As depicted in FIG. 2, conduit 120 extends from wellhead 115 (as illustrated in FIG. 1) into wellbore 125 penetrating subterranean formation 130. After descending through heel 145 of wellbore 125, conduit 120 is coupled to one or more packers 150 positioned to isolate an interval of wellbore 125. Foamed fracturing fluid 155, as described herein, may exit conduit 120 through openings 160. Foamed fracturing fluid 155 may be used to form and/or enhance primary fracture 165 and/or other fractures such as the secondary, tertiary, etc. fractures of a fracture or microfracture network. After the completion of the fracturing operation, the action of the breaker degrades the polymeric gelling agent and a phosphonate degradation product is released. This phosphonate degradation product may reduce scaling in the wellbore 125 as the wellbore 125 is brought to production.

Although FIGS. 1 and 2 depict a conduit 120 present in wellbore 125, alternative methods of delivering a foamed fracturing fluid downhole may be used. For example, conduit 120 may be absent and the foamed fracturing fluid may be pumped downhole within wellbore 125 via the casing 135 through perforations within casing 135 to form or enhance primary fracture 165. Additional methods of delivering the foamed fracturing fluid to a targeted downhole location may be used as would be readily apparent to one of ordinary skill in the art.

It is to be recognized that system 100 is merely exemplary in nature, and various additional components may be present that have not necessarily been depicted in FIGS. 1 and 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

It should be clearly understood that the examples illustrated by FIGS. 1 and 2 are merely general applications of the principles of this disclosure in practice, and a wide variety of other examples are possible. Therefore, the scope of this disclosure is not limited in any manner to the details of FIGS. 1 and 2 as described herein.

Figure 3:
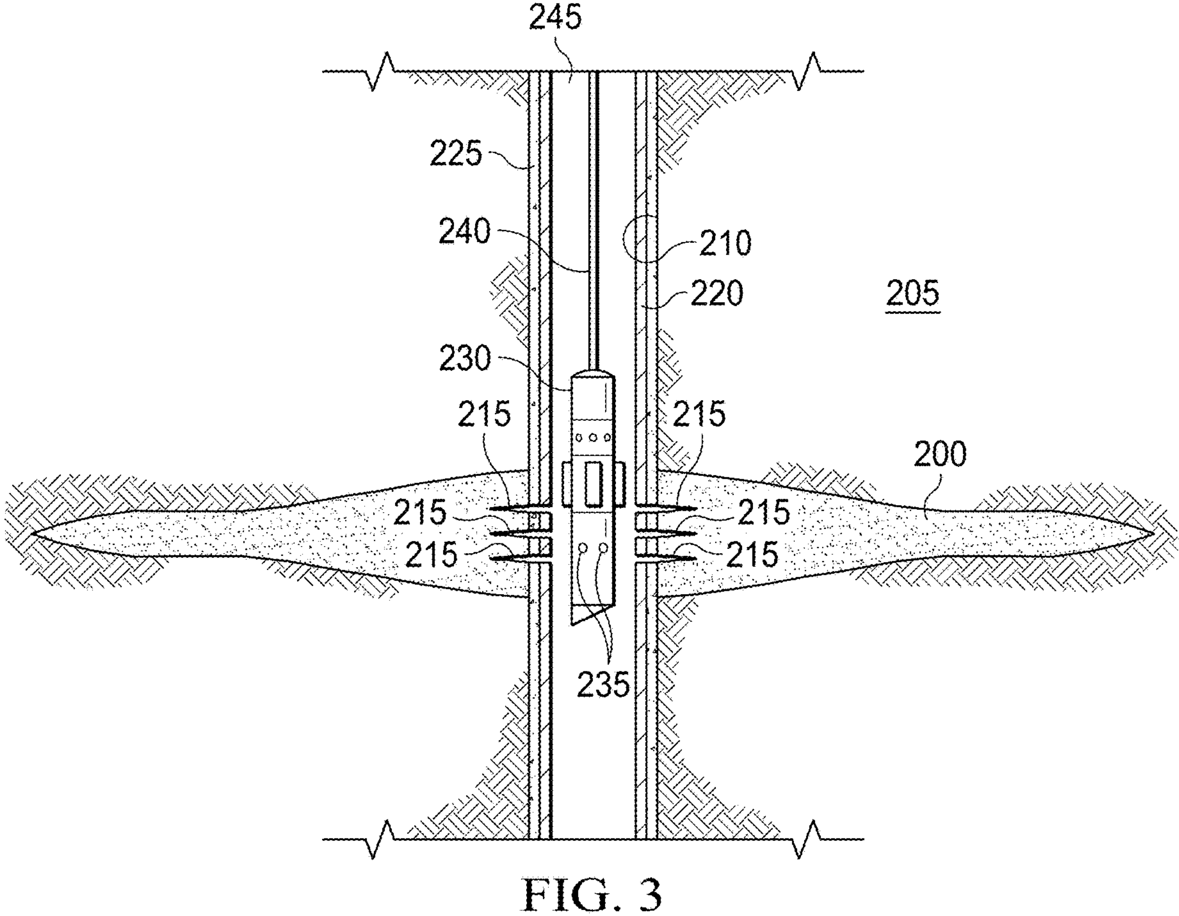
FIG. 3 is a perspective illustration of the use of the foamed fracturing fluids described herein to place proppant within a fracture of a subterranean formation in accordance with one or more examples described herein.

FIG. 3 is a perspective illustration of the use of the foamed fracturing fluids described herein to place proppant within a fracture of a subterranean formation. In a hydraulic fracturing operation, fracture 200 is formed in subterranean formation 205 of wellbore 210. To initiate the operation, perforations 215 are made that penetrate through casing 220, cement sheath 225, and into subterranean formation 205. Foamed fracturing fluid is introduced into the fractured portion of the subterranean formation 205 through perforations 215. While subterranean formation 205 may be perforated using any suitable technique, the present example utilizes jetting tool 230. Jetting tool 230 may be any suitable assembly for use in subterranean operations through which the foamed fracturing fluid may be jetted at high pressures. By way of example, when used to form perforations 215, jetting tool 230 should be configured to jet a fluid against casing 220 and cement sheath 225 such that perforations 215 may be formed. As illustrated, jetting tool 230 may contain ports 235 for discharging a fluid from jetting tool 230.

In operation, jetting tool 230 may be positioned in wellbore 210 adjacent to the portion of wellbore 210 where fracture formation is desired. As illustrated, jetting tool 230 may be coupled to work string 240 (e.g., piping, coiled tubing, etc.) and lowered into wellbore 210 to the desired position. Once jetting tool 230 has been positioned, the foamed fracturing fluid may be pumped down through work string 240, into jetting tool 230, out through ports 235, and against the interior surface of casing 220 causing perforations 215 to be formed through casing 220 and cement sheath 225.

In accordance with the examples described herein, the foamed fracturing fluid may comprise proppant. In one optional example, the proppant may be mixed with the foamed fracturing fluid on the fly as the proppant is introduced into wellbore 210. In this example, a foamed fracturing fluid may be introduced into fracture 200 to place proppant within the fracture.

Alternative wellbore tools for introduction of the foamed fracturing fluid may include, but are not limited to, bull heading, coil tubing, or jointed pipe (e.g., with straddle packers, jetting tools, etc.). In the present example, the foamed fracturing fluid is injected by jetting tool 230 while jetting tool 230 is still in position in wellbore 210. Utilization of jetting tool 230 may reduce the need for equipment, such as packers, to isolate the treated formation interval. Alternatively, the foamed fracturing fluid may be injected through annulus 245 between work string 240 and casing 220.

It should be clearly understood that method illustrated by FIG. 3 is merely a general application of the principles of this disclosure in practice, and a wide variety of other examples are possible. Therefore, the scope of this disclosure is not limited in any manner to the details of FIG. 3 as described herein.

The foamed fracturing fluids disclosed herein may directly or indirectly affect one or more components or pieces of equipment associated with or which may come into contact with the foamed fracturing fluids such as, but not limited to, wellbore casing, wellbore liner, completion string, insert strings, drill string, coiled tubing, slickline, wireline, drill pipe, drill collars, mud motors, downhole motors and/or pumps such as electrosubmersible pumps (ESPs), cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), jetting tools, sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present embodiments, the following examples of certain aspects of some embodiments are given. In no way should the following examples be read to limit, or define, the entire scope of the embodiments.

EXAMPLES

Figure 4:
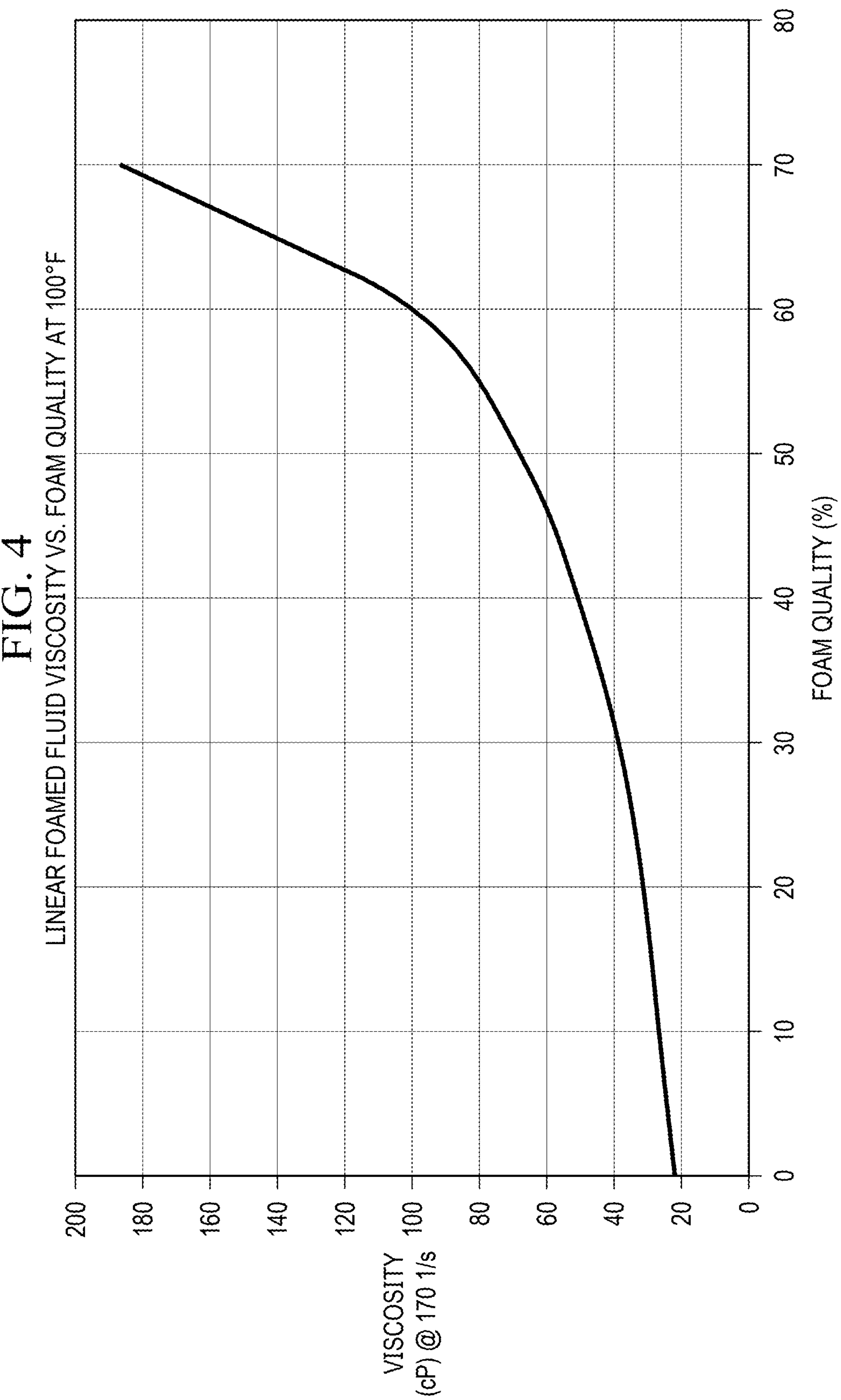
FIG. 4 is a graph of foamed fluid viscosity in accordance with one or more examples described herein.

The foamed fracturing fluid performance was measured by combining tap water, 2 gal/Mgal hydration aid agent, 10 gal/Mgal polymeric gelling agent with a ten-minute hydration, and 10 gal/Mgal foaming agent and then injecting this fluid into a pressurized foam rheometer. The fluid viscosity was measured while adjusting the foam quality of the entrained $CO_2$ from 0 to 70%. The gel viscosity increased from 20 to 80 cP at a shear rate of 170 l/s after 70% (volume quality) was injected to the linear gel to make a foamed $CO_2$ linear gel. With $CO_2$, the foamed fluid viscosity increased greatly compared to the linear gel itself. A graph of the foamed fluid viscosity is illustrated in FIG. 4.

Figure 5:
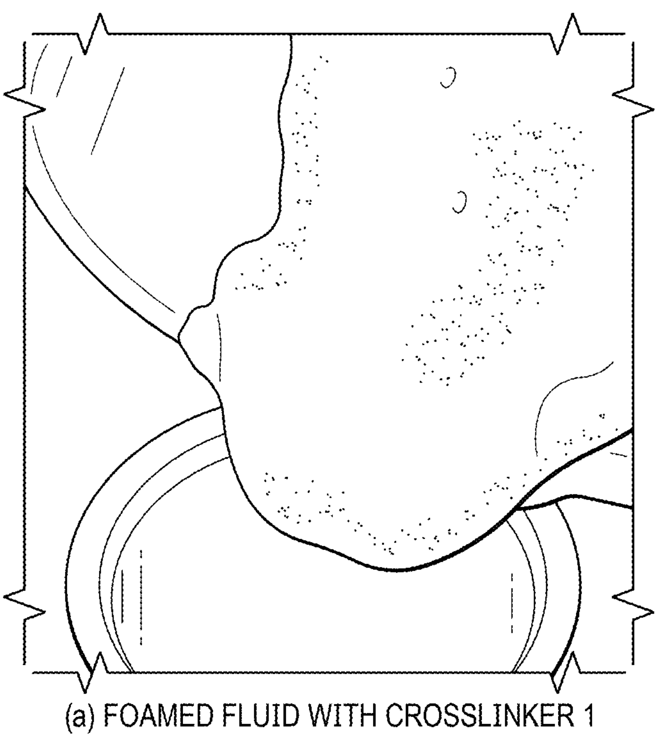
FIG. 5 is an illustration of a flowable crosslinked fracturing fluid in accordance with one or more examples described herein.
Figure 5:
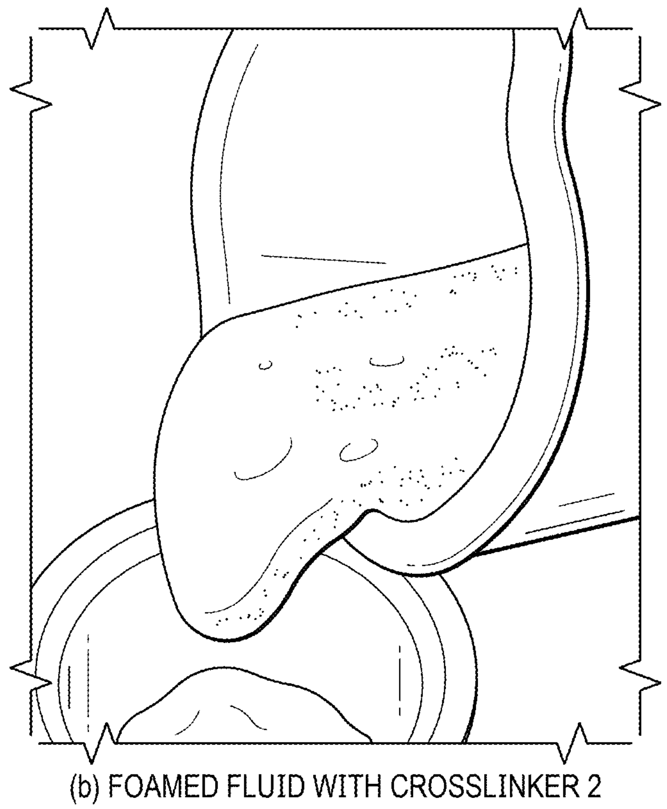
Figure 6:
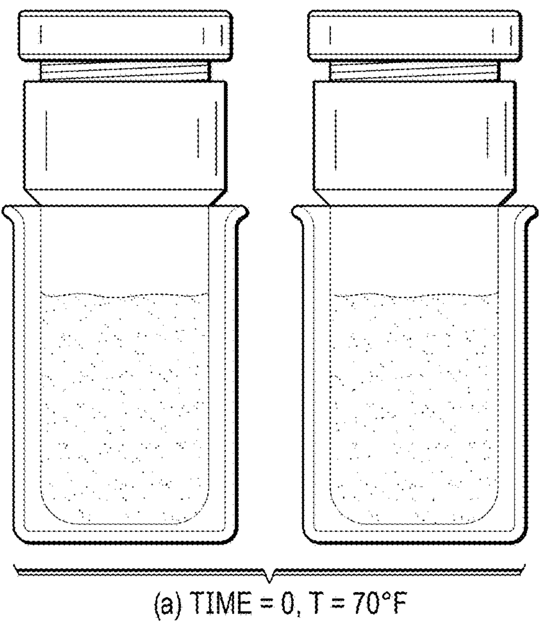
FIG. 6 is an illustration of sample stability over time in accordance with one or more examples described herein.
Figure 6:
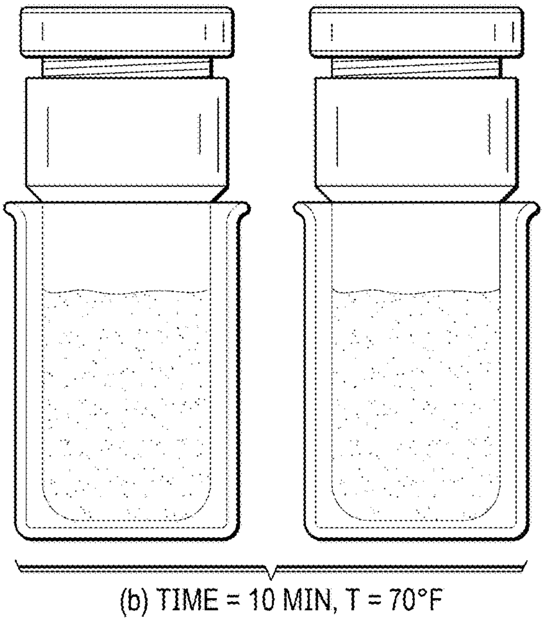
Figure 6:
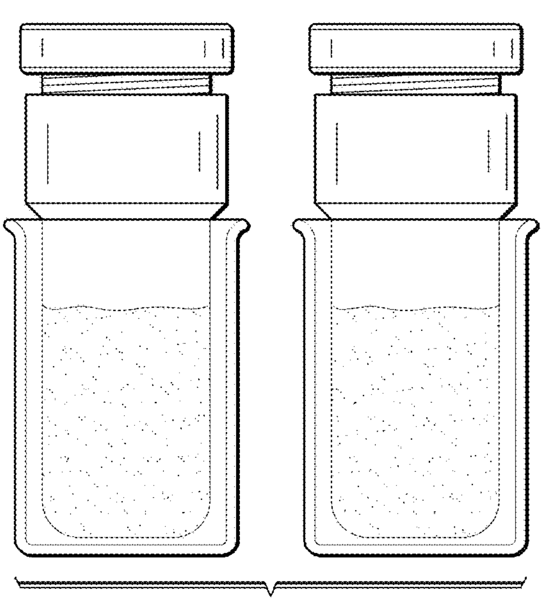

Another experiment was conducted by preparing a crosslinked foamed fracturing fluid. The crosslinked foamed fracturing fluid was prepared by combining tap water, 2 gal/Mgal surfactant, 10 gal/Mgal polymeric gelling agent with a ten-minute hydration, and 15 lb/Mgal gel stabilizer. To this formulation, 10 gal/Mgal foaming agent and crosslinker were then added into the base gel. After thirty-seconds of mixing, the fluid was vigorously agitated and foamed to create a fluid with double the volume of the original. The fluid pH was then adjusted to be between about 4.5 to about 5.5. Two foamed crosslinked fluid were prepared with two types of zirconium crosslinkers respectively. Fluid #1 was prepared with crosslinker #1 while fluid #2 was prepared with crosslinker #2. Crosslinker #1 is tetra-N-propyl zirconate, and crosslinker #2 is zirconium sulfate. Crosslinker #1 was added at 2.5 gal/Mgal, while crosslinker #2 added at 0.5 gal/Mgal. After this crosslinked fluid was prepared, the fluid viscosity was measured. The viscosity had increased but the fluid was still flowable, as seen in FIG. 5. The two fluid samples were then placed into a glass tube at 70° F. and observed over 2 hours. The foamed fluid demonstrated sufficient stability at 70° F. for 10 minutes. The samples were then placed into an oven set at 250° F. and heated for 2 hours. The foamed fluid remained stable. These sample tests are illustrated in FIG. 6.

Figure 7:
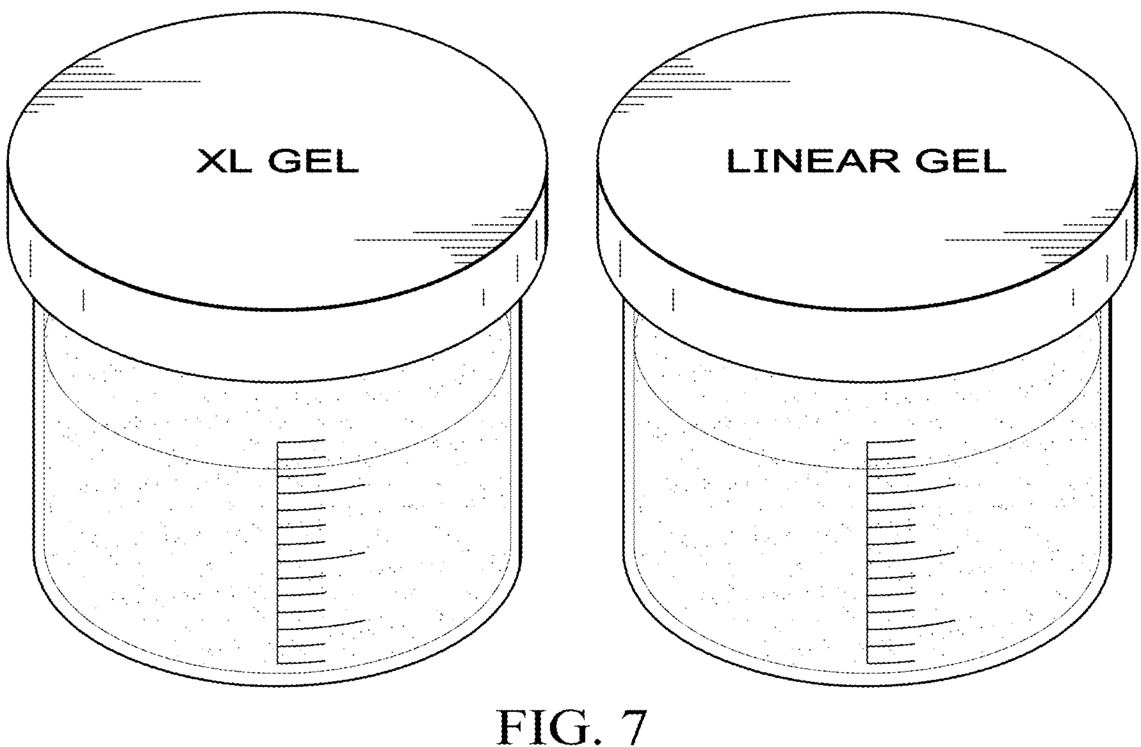
FIG. 7 is an illustration of a broken fracturing fluid in accordance with one or more examples described herein.

Another experiment was conducted to demonstrate the scale protection of the degraded polymeric gelling agent. A new foamed fracturing fluid was formed by combining tap water, 2 gal/Mgal surfactant, and 10 gal/Mgal polymeric gelling agent with ten-minute hydration. This sample fluid was then divided into two portions. In the first portion, 10 gal/Mgal breaker was added. In the second portion, the fluid pH was adjusted to 5 with a buffer, followed by the addition of 10 gal/Mgal breaker and 0.5 gpt crosslinker #2. The two fluid samples were then placed into a water bath at 200° F. for 24 hours. The fluid was broken completely and the two portions are illustrated by FIG. 7

Another experiment was conducted to observe the scaling protection from foamed fracturing fluids prepared in two different ways. The results are illustrated by FIG. 8. The blank mixture consisted of a barium brine with 50 ppm sulfate ions. The mixture composition generates barite with an oversaturation ratio at 128. The dullness on the glass bottom indicates the formation of barite scale for the blanks when the foamed fracturing fluid was not added (Samples A). To demonstrate the appearance of a fluid without scale precipitation, another control sample was mixed with the barium brine and a broken fracturing fluid of either the linear gel or the crosslinked fluid (Samples B). For Samples C and D, the broken fracturing fluid at 2 or 4 gal/Mgal, linear gel or crosslinked fluid, were added into the barium brine and then sulfate was added. The brightness is a sign of the samples being free of the scale precipitation shown in the controls (Samples B) and in the presence of 2 gpt and 4 gpt of broken fluids (Samples C and D). In a 4-hr static jar testing, barite was observed immediately upon scaling fluid mixing, whereas 2-gpt and 4-gpt could prevent the scale precipitation up to 4 hours for the described testing conditions.

Provided are foamed fracturing fluids for treating a wellbore in accordance with the disclosure and the illustrated FIGs. An example foamed fracturing fluid comprises an aqueous base fluid, a polymeric gelling agent comprising acrylamide and phosphonate monomers, a foaming agent, a hydration aid, a crosslinker, a gel stabilizer, a breaker, a pH adjustor, and a gas constituent comprising carbon dioxide, nitrogen, or a combination of carbon dioxide and nitrogen.

Additionally or alternatively, the foamed fracturing fluids may include one or more of the following features individually or in combination. The gelling agent may be a copolymer of the acrylamide and phosphonate monomers. The gelling agent may be a terpolymer further comprising a third monomer selected from the group consisting of vinyl sulfonate, 2-acrylamido-2-methylpropane-sulfonic acid monomer, an N-vinylamide monomer, acrylic acid, maleic acid, a methacrylic acid-based monomer, and any derivatives thereof. The aqueous base fluid may be selected from the group consisting of freshwater, saltwater, brackish water, brine, seawater, or any combination thereof. The foaming agent may be selected from the group consisting of betaines, sulfated or sulfonated alkoxylates, alkyl quaternary amines, alkoxylates of linear alcohols, alkyl sulfonates, alkyl aryl sulfonates, C10-C20 alkyl diphenyl ether sulfonates, nonionic alkyl amines, anionic surfactant aliphatic sulfonic acid, slats thereof and any combination thereof. The crosslinker may be a zirconium ion, a titanium ion, or a combination of zirconium and titanium ions. The breaker may be selected from the group consisting of sodium chlorite, sodium chlorate, sodium bromate, sodium persulphate, dichromate, permanganates, peroxydisulfate, sodium perborate, sodium carbonate peroxide, sodium perborate, sodium percarbonate, ammonium persulfate, potassium persulfate, magnesium peroxide, hydrogen peroxide, tert-Butyl hydroperoxide, and any combination thereof. The foamed fracturing fluid may further comprise a proppant and/or microproppant. The crosslinker may comprise a metal and the gas constituent comprises carbon dioxide.

Provided are methods for treating a wellbore with a foamed fracturing fluid in accordance with the disclosure and the illustrated FIGs. An example method comprises introducing a foamed fracturing fluid into a wellbore penetrating the subterranean formation at a pressure sufficient to create and/or expand a fracture in the subterranean formation. The foamed fracturing fluid comprises an aqueous base fluid, a polymeric gelling agent comprising acrylamide and phosphonate monomers, a hydration aid, a foaming agent, a crosslinker, a gel stabilizer, a breaker, a pH adjustor, and a gas constituent comprising carbon dioxide, nitrogen, or a combination of carbon dioxide and nitrogen.

Additionally or alternatively, the method may include one or more of the following features individually or in combination. The method may further comprise breaking or allowing the foamed fracturing fluid to break thereby degrading the polymeric gelling agent and releasing a phosphonate degradation product. The wellbore may have a bottom hole temperature of about 250° F. to about 500° F. The foamed fracturing fluid may not comprise a scale inhibitor as it is introduced into the wellbore. The wellbore may be a wellbore of a geothermal well. The gelling agent may be a copolymer of the acrylamide and phosphonate monomers. The gelling agent may be a terpolymer further comprising a third monomer selected from the group consisting of vinyl sulfonate, 2-acrylamido-2-methylpropane-sulfonic acid monomer, an N-vinylamide monomer, acrylic acid, maleic acid, a methacrylic acid-based monomer, and any derivatives thereof. The aqueous base fluid may be selected from the group consisting of freshwater, saltwater, brackish water, brine, seawater, or any combination thereof. The foaming agent may be selected from the group consisting of betaines, sulfated or sulfonated alkoxylates, alkyl quaternary amines, alkoxylates of linear alcohols, alkyl sulfonates, alkyl aryl sulfonates, C10-C20 alkyl diphenyl ether sulfonates, nonionic alkyl amines, anionic surfactant aliphatic sulfonic acid, slats thereof and any combination thereof. The crosslinker may be a zirconium ion, a titanium ion, or a combination of zirconium and titanium ions. The breaker may be selected from the group consisting of sodium chlorite, sodium chlorate, sodium bromate, sodium persulphate, dichromate, permanganates, peroxydisulfate, sodium perborate, sodium carbonate peroxide, sodium perborate, sodium percarbonate, ammonium persulfate, potassium persulfate, magnesium peroxide, hydrogen peroxide, tert-Butyl hydroperoxide, and any combination thereof. The foamed fracturing fluid may further comprise a proppant and/or microproppant. The crosslinker may comprise a metal and the gas constituent comprises carbon dioxide.

Provided are systems for treating a wellbore with a foamed fracturing fluid in accordance with the disclosure and the illustrated FIGs. An example system comprises a foamed fracturing fluid comprising an aqueous base fluid, a polymeric gelling agent comprising acrylamide and phosphonate monomers, a hydration aid, a foaming agent, a gel stabilizer, a crosslinker, a breaker, a pH adjustor, and a gas constituent comprising carbon dioxide, nitrogen, or a combination of carbon dioxide and nitrogen. The system further comprises mixing equipment configured to mix the aqueous base fluid, the polymeric gelling agent, the foaming agent, the hydration aid, the gel stabilizer, the crosslinker, the breaker, the pH adjustor, and the gas constituent to form the foamed fracturing fluid; and pumping equipment configured to pump the foamed fracturing fluid into a wellbore penetrating the subterranean formation; wherein the pumping equipment is configured to pump the foamed fracturing fluid at a pressure sufficient to create and/or expand a fracture in the subterranean formation.

Additionally or alternatively, the system may include one or more of the following features individually or in combination. The gelling agent may be a copolymer of the acrylamide and phosphonate monomers. The gelling agent may be a terpolymer further comprising a third monomer selected from the group consisting of vinyl sulfonate, 2-acrylamido-2-methylpropane-sulfonic acid monomer, an N-vinylamide monomer, acrylic acid, maleic acid, a methacrylic acid-based monomer, and any derivatives thereof. The aqueous base fluid may be selected from the group consisting of freshwater, saltwater, brackish water, brine, seawater, or any combination thereof. The foaming agent may be selected from the group consisting of betaines, sulfated or sulfonated alkoxylates, alkyl quaternary amines, alkoxylates of linear alcohols, alkyl sulfonates, alkyl aryl sulfonates, C10-C20 alkyl diphenyl ether sulfonates, nonionic alkyl amines, anionic surfactant aliphatic sulfonic acid, slats thereof and any combination thereof. The crosslinker may be a zirconium ion, a titanium ion, or a combination of zirconium and titanium ions. The breaker may be selected from the group consisting of sodium chlorite, sodium chlorate, sodium bromate, sodium persulphate, dichromate, permanganates, peroxydisulfate, sodium perborate, sodium carbonate peroxide, sodium perborate, sodium percarbonate, ammonium persulfate, potassium persulfate, magnesium peroxide, hydrogen peroxide, tert-Butyl hydroperoxide, and any combination thereof. The foamed fracturing fluid may further comprise a proppant and/or microproppant. The crosslinker may comprise a metal and the gas constituent comprises carbon dioxide.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for treating a subterranean formation, the method comprises:

introducing a foamed fracturing fluid into a wellbore penetrating the subterranean formation at a pressure sufficient to create and/or expand a fracture in the subterranean formation; wherein the foamed fracturing fluid comprises:
- an aqueous base fluid,
- a polymeric gelling agent comprising acrylamide and phosphonate monomers,
- a hydration aid,
- a foaming agent,
- a crosslinker,
- a gel stabilizer,
- an oxidative breaker,
- a pH adjustor, and
- a gas constituent comprising carbon dioxide, nitrogen, or a combination of carbon dioxide and nitrogen;

breaking or allowing the foamed fracturing fluid to break thereby degrading the polymeric gelling agent and releasing a phosphonate degradation product to inhibit scale formation.

2. The method of claim 1, wherein the wellbore has a bottom hole temperature of about 250° F. to about 500° F.

3. The method of claim 1, wherein the foamed fracturing fluid does not comprise a scale inhibitor as it is introduced into the wellbore.

4. The method of claim 1, wherein the wellbore is a wellbore of a geothermal well.

5. The method of claim 1, wherein the gelling agent is a copolymer of acrylamide and phosphonate monomers.

6. The method of claim 1, wherein the gelling agent is a terpolymer further comprising a third monomer selected from the group consisting of vinyl sulfonate, 2-acrylamido-2-methylpropane-sulfonic acid monomer, an N-vinylamide monomer, acrylic acid, maleic acid, a methacrylic acid-based monomer, and any derivatives thereof.

7. The method of claim 1, wherein the crosslinker comprises a metal and the gas constituent comprises carbon dioxide.

8. The method of claim 1, wherein the aqueous base fluid is selected from the group consisting of freshwater, saltwater, brackish water, brine, seawater, or any combination thereof.

9. The method of claim 1, wherein the foaming agent is selected from the group consisting of betaines, sulfated or sulfonated alkoxylates, alkyl quaternary amines, alkoxylates of linear alcohols, alkyl sulfonates, alkyl aryl sulfonates, C10-C20 alkyl diphenyl ether sulfonates, nonionic alkyl amines, anionic surfactant aliphatic sulfonic acid, slats thereof and any combination thereof.

10. The method of claim 1, wherein the crosslinker is a zirconium ion, a titanium ion, or a combination of zirconium and titanium ions.

11. The method of claim 1, wherein the breaker is selected from the group consisting of sodium chlorite, sodium chlorate, sodium bromate, sodium persulphate, dichromate, permanganates, peroxydisulfate, sodium perborate, sodium carbonate peroxide, sodium perborate, sodium percarbonate, ammonium persulfate, potassium persulfate, magnesium peroxide, hydrogen peroxide, tert-Butyl hydroperoxide, and any combination thereof.

12. The method of claim 1, further comprising a proppant and/or microproppant.

13. A system for treating a subterranean formation, the system comprises:

a foamed fracturing fluid comprising:

an aqueous base fluid, a polymeric gelling agent comprising acrylamide and phosphonate monomers, a hydration aid, a foaming agent, a gel stabilizer, a crosslinker, an oxidative breaker configured to break the foamed fracturing fluid to release a phosphonate degradation product, a pH adjustor, and a gas constituent comprising carbon dioxide, nitrogen, or a combination of carbon dioxide and nitrogen;

mixing equipment configured to mix the aqueous base fluid, the polymeric gelling agent, the foaming agent, the hydration aid, the gel stabilizer, the crosslinker, the oxidative breaker, the pH adjustor, and the gas constituent to form the foamed fracturing fluid; and pumping equipment configured to pump the foamed fracturing fluid into a wellbore penetrating the subterranean formation; wherein the pumping equipment is configured to pump the foamed fracturing fluid at a pressure sufficient to create and/or expand a fracture in the subterranean formation.

14. The system of claim 13, wherein the gelling agent is a copolymer of acrylamide and phosphonate monomers.

15. The system of claim 13, wherein the gelling agent is a terpolymer further comprising a third monomer selected from the group consisting of vinyl sulfonate, 2-acrylamido-2-methylpropane-sulfonic acid monomer, an N-vinylamide monomer, acrylic acid, maleic acid, a methacrylic acid-based monomer, and any derivatives thereof.

16. The system of claim 13, wherein the aqueous base fluid is selected from the group consisting of freshwater, saltwater, brackish water, brine, seawater, or any combination thereof.

17. The system of claim 13, wherein the foaming agent is selected from the group consisting of betaines, sulfated or sulfonated alkoxylates, alkyl quaternary amines, alkoxylates of linear alcohols, alkyl sulfonates, alkyl aryl sulfonates, C10-C20 alkyl diphenyl ether sulfonates, nonionic alkyl amines, anionic surfactant aliphatic sulfonic acid, slats thereof and any combination thereof.

18. The system of claim 13, wherein the crosslinker is a zirconium ion, a titanium ion, or a combination of zirconium and titanium ions.

19. The system of claim 13, wherein the breaker is selected from the group consisting of sodium chlorite, sodium chlorate, sodium bromate, sodium persulphate, dichromate, permanganates, peroxydisulfate, sodium perborate, sodium carbonate peroxide, sodium perborate, sodium percarbonate, ammonium persulfate, potassium persulfate, magnesium peroxide, hydrogen peroxide, tert-Butyl hydroperoxide, and any combination thereof.

20. The system of claim 13, further comprising the phosphonate degradation product.

* * * * *